US010680677B2

(12) United States Patent
Wobak et al.

(10) Patent No.: US 10,680,677 B2
(45) Date of Patent: Jun. 9, 2020

(54) NFC SYSTEM WAKEUP WITH ENERGY HARVESTING

(71) Applicant: NXP B.V., Eindhoven (NL)

(72) Inventors: Markus Wobak, Graz (AT); Leonhard Kormann, Stallhofen (AT); Juergen Schroeder, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/225,759

(22) Filed: Aug. 1, 2016

(65) Prior Publication Data

US 2018/0034507 A1   Feb. 1, 2018

(51) Int. Cl.
*H04B 5/00*   (2006.01)

(52) U.S. Cl.
CPC ......... *H04B 5/0037* (2013.01); *H04B 5/0031* (2013.01); *H04B 5/0056* (2013.01); *H04B 5/0068* (2013.01)

(58) Field of Classification Search
CPC ............. H04W 52/0209; H04B 5/0037; H04B 5/0031; H04B 5/0056; H04B 5/0068
USPC ................................. 455/41.1–41.3
See application file for complete search history.

(56) References Cited

U.S. PATENT DOCUMENTS

| 8,830,710 | B2 * | 9/2014 | Perreault | H03H 7/38 363/67 |
| 2010/0248653 | A1 | 9/2010 | Merlin | |
| 2010/0291871 | A1 | 11/2010 | Butler | |
| 2012/0293009 | A1 * | 11/2012 | Kim | H02H 7/1252 307/104 |
| 2014/0295756 | A1 | 10/2014 | Merlin | |
| 2015/0091385 | A1 * | 4/2015 | Manian | H04B 5/0037 307/104 |
| 2015/0154486 | A1 * | 6/2015 | McFarthing | G06K 19/0712 235/492 |
| 2016/0338646 | A1 * | 11/2016 | Lee | A61B 5/6832 |
| 2017/0026723 | A1 * | 1/2017 | Wan | H04W 4/70 |
| 2017/0310125 | A1 * | 10/2017 | Estrada | H02M 3/338 |
| 2017/0331524 | A1 * | 11/2017 | Aranyosi | H04B 5/0031 |

FOREIGN PATENT DOCUMENTS

WO     2011/097116 A2     8/2011

OTHER PUBLICATIONS

Partial European Search Report 17183009.4 (dated Nov. 15, 2017).

\* cited by examiner

*Primary Examiner* — Edward F Urban
*Assistant Examiner* — Angelica M Perez

(57) ABSTRACT

The present invention provides for a system that makes use of a system power supply enable switch controlled by a near field communications (NFC) frontend with energy harvesting. In one embodiment, RF power in the 13.56 MHz band generated by a NFC counterpart (such as a mobile phone) is detected by the energy harvesting unit being part of the battery-unpowered NFC communication device. After activation, the system can perform actions required to communicate to the presented device (i.e., the NFC counterpart). Later, the system can switch itself into the unpowered state again. In another embodiment, this feature can also be used to control an NFC protection circuitry very quickly after the NFC device is exposed to an external HF (high frequency) field.

8 Claims, 7 Drawing Sheets

NFC SYSTEM WAKEUP WITH ENERGY HARVESTING

FIELD

The described embodiments relate generally to devices and methods for NFC (near field communication) system, and more particularly to devices and methods that provide for NFC system wakeup with energy harvesting.

BACKGROUND

Battery operated NFC devices require lowest current consumption during operation and standby. Especially for NFC contactless access systems, changing batteries is a main running cost contributor of the NFC system. If this battery exchange rate can be reduced by lowering the overall current consumption of the system, the overall running costs of the NFC system will be reduced.

Currently, NFC devices require a low power standby configuration in order to detect external radio frequency (RF) fields. The host controller and the NFC frontend are in a low power mode requiring a battery supply present all the time causing a battery supply current consumption. Additional energy may be needed for supply voltage conditioning (e.g., low drop regulators, DC-to-DC (direct current to direct current) converters). Therefore, there is a continuous energy consumption that limits the total NFC device availability and lifetime.

Therefore, it is desirable to have devices and methods that can provide for an NFC device to be completely turned off (i.e., "zero" power configuration) when the NFC device is not detecting an external radio frequency (RF) field.

SUMMARY

It is an object of the invention to have devices and methods that can provide for an NFC device to be completely turned off (i.e., "zero" power configuration) when the NFC function is not active. This would, in turn, allow a battery operated NFC device to have a lower overall current consumption. This lowered current consumption of the system would then reduce the battery exchange rate, leading to a reduction in the overall running costs of the NFC system. However, such a system with completely turned off NFC device would need devices and methods that can provide for NFC system wakeup. One possibility which is state of the art is a mechanical switch (button) which needs to be actuated by a user to change the system from power-off to power-on mode. A more convenient possibility would be, that the NFC device detects an external radio frequency (RF) field and changes its state from power-off to power-on mode based on this RF field information. This will increase the convenience for the user compared to a mechanical switch (button), while allowing for a longer battery lifetime.

In order to achieve the object defined above, a system making use of a system power supply enable switch controlled by a near field communications (NFC) frontend with energy harvesting is disclosed. RF power in the 13.56 MHz band generated by an NFC counterpart device (such as a mobile phone) is detected by the energy harvesting unit that is a part of the NFC communication device not powered by a battery. After activation, the system can perform actions required to communicate to the NFC counterpart device (such as a mobile phone). Later, in some embodiments, the system can switch itself into the unpowered state again. In some other embodiments, a second different system can switch the system into the unpowered state again.

In summary, energy harvesting functionality for NFC devices is used to supply the NFC device in case of no battery supply available (see for example US 2010/0248653 and US 2014/0295756, which describe a "powered-by-the-field" mode). In one embodiment, an energy harvesting module is comprising of a bridge rectifier circuit and a blocking capacitor. It is connected to the NFC antenna directly or via external matching components. It derives a direct current (DC) voltage out of a 13.56 MHz high frequency (HF) field. Here, no power supply is required to operate the energy harvesting module.

A feature of this invention disclosure is to use the energy-harvesting functionality of an NFC device as an event to trigger system configuration changes without additional battery power supply. An example of this is to connect the battery to power up the system after detecting an external RF field. A further application is to control an NFC protection circuitry very quickly after the NFC device is exposed to an external HF field.

The present invention provides for a method comprising: detecting, by an energy harvesting unit associated with a near field communication (NFC) system, an active external radio frequency (RF) field; generating, by the energy harvesting unit associated with the NFC system in response to the detecting, an output signal; using the output signal to enable a switch to a power supply or an NFC protection circuit.

In some embodiments, the energy harvesting unit is capable of supplying power to the NFC system without using power from a battery.

In some embodiments, the energy harvesting unit is a part of an NFC communication device that is not powered by a battery.

In some embodiments, the energy harvesting unit comprises: a bridge rectifier circuit, and a blocking capacitor.

In some embodiments, the energy harvesting unit derives a direct current (DC) voltage out of an alternating current (AC) high frequency (HF) field.

In some embodiments, the power supply is a system power supply.

In some embodiments, the active external radio frequency (RF) field is generated by an NFC counterpart device.

In some embodiments, the NFC counterpart device is a mobile phone.

In some embodiments, the switch to the power supply or the NFC protection circuit remains enabled even when the energy harvesting unit no longer detects the active external radio frequency (RF) field.

In some embodiments, the method further comprises: disabling, by the NFC system, the switch to the power supply or the NFC protection circuit, wherein the NFC system comprises a NFC frontend and other system parts.

In some embodiments, the method further comprises: disabling, by a second system, the switch to the power supply or the NFC protection circuit, wherein the NFC system comprises a NFC frontend and other system parts, wherein the second system is different from the NFC system.

The present invention also provides for a device comprising: an energy harvesting unit associated with a near field communication (NFC) system. The energy harvesting unit is configured to detect an active external radio frequency (RF) field. The energy harvesting unit is configured to generate an output signal in response to detecting the active external radio frequency (RF) field. The device also comprises a switch to enable or disable a power supply. The switch is configured to enable the power supply in response to receiving the output signal.

In some embodiments, the energy harvesting unit is capable of supplying power to the NFC system without using power from a battery.

In some embodiments, the energy harvesting unit comprises: a bridge rectifier circuit, and a blocking capacitor.

In some embodiments, the energy harvesting unit derives a direct current (DC) voltage out of an alternating current (AC) high frequency (HF) field.

In some embodiments, the active external radio frequency (RF) field is generated by an NFC counterpart device.

In some embodiments, the switch is further configured to remain enabled even when the energy harvesting unit no longer detects the active external radio frequency (RF) field.

In some embodiments, the device is further comprising of other system parts, wherein the device is configured to use the switch to disable the power supply.

The present invention further provides for a device comprising: an energy harvesting unit associated with a near field communication (NFC) system. The energy harvesting unit is configured to detect an active external radio frequency (RF) field. The energy harvesting unit is configured to generate an output signal in response to detecting the active external radio frequency (RF) field. The device further comprises a switch to enable or disable an NFC protection circuit. The switch is configured to enable the NFC protection circuit in response to receiving the output signal.

In some embodiments, the switch is further configured to remain enabled even when the energy harvesting unit no longer detects the active external radio frequency (RF) field.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
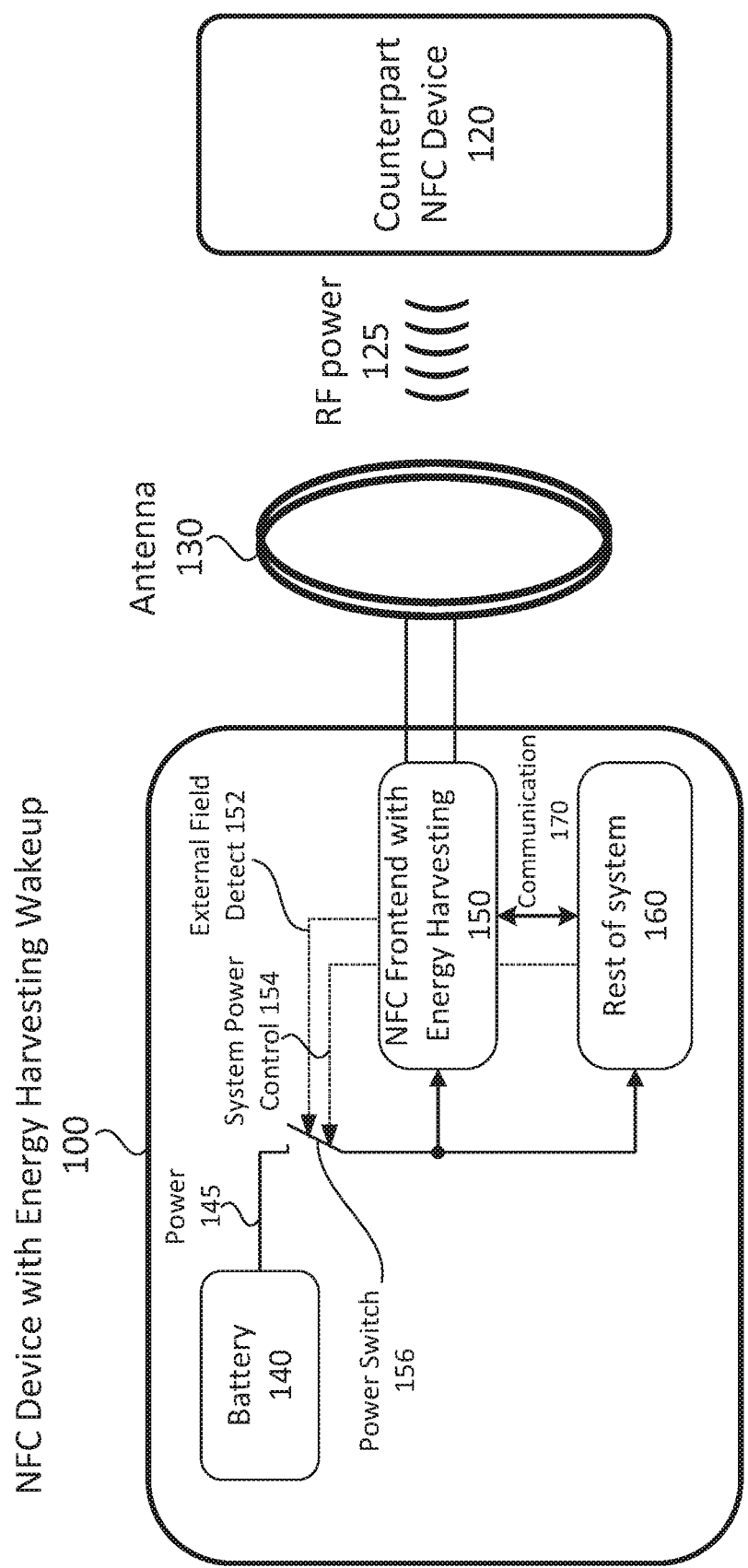
FIG. 1 shows an NFC device with energy harvesting wakeup, together with a counterpart NFC device.

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Energy harvesting functionality for NFC devices is used to supply the NFC device in case of no battery supply available (see for example US 2010/0248653, US 2014/0295756, which describe a "powered-by-the-field" mode). The present invention describes a system that includes an energy harvesting module. In some embodiments, the energy harvesting module includes a bridge rectifier circuit and a blocking capacitor. The energy harvesting module is connected to the NFC antenna directly or via external matching components. In some embodiments, the energy harvesting module derives a DC voltage out of a 13.56 MHz HF field. No external supply voltage is required to operate the energy harvesting module.

An advantage of the present invention is that the system uses the energy harvesting functionality of a NFC device as an event to trigger system configuration changes without additional battery supply voltage. An example of this is to connect the battery to power up the system after detecting an external RF field. A further application is to control a NFC protection circuitry very quickly after the NFC device is exposed to an external HF field.

An embodiment of the invention (see FIG. 1) comprises a near field communications (NFC) device 100 with energy harvesting wakeup and a counterpart NFC device 120. NFC device 100 includes an antenna 130, a NFC frontend 150 with energy harvesting, a battery 140, a power switch 156, and the rest of the system (160).

Initially, when NFC device 100 is not active, power switch 156 disconnects battery 140 from NFC frontend 150 and the rest of the system 160, so power 145 is no longer supplied to NFC frontend 150 and the rest of the system 160. Disconnecting battery 140 from NFC frontend 150 and the rest of the system 160 saves power, prolonging the life of battery 140. Then, at a later point, a counterpart NFC device 120 (such as a mobile phone) is brought near to antenna 130. Counterpart NFC device 120 generates radio frequency (RF) power 125, typically in the 13.56 MHz band. RF power 125 is in turn detected by the energy harvesting unit of NFC frontend 150 via an antenna 130. At this point, NFC device 100 is unpowered by the battery, but the energy harvesting unit of NFC frontend 150 is capable of detecting RF power 125, and transmitting an external field detect signal 152 to power switch 156. External field detect signal 152 triggers power switch 156 to be switched on, connecting battery 140 to NFC frontend 150 and the rest of the system 160. With battery power supplied, NFC device 100 is switched on and activated. After activation, NFC device 100 can perform actions required to communicate to the presented device 120 (e.g., a mobile phone). Activation also can enable communication 170 between NFC frontend 150 and the rest of the system 160. Later, in some embodiments, NFC device 100 can switch itself into the unpowered state again. In some other embodiments, a second device (not shown in FIG. 1) can switch NFC device 100 into the unpowered state again.

As described earlier, in some embodiments, NFC device 100 can switch itself into the unpowered state again. Regarding this scenario, in some embodiments, switching NFC device 100 itself into the unpowered state can be performed by the rest of the system (160). In some other embodiments, switching NFC device 100 itself into the unpowered state can be performed by the NFC frontend 150. In yet some other embodiments, switching NFC device 100 itself into the unpowered state can be performed by some other parts of the NFC device 100.

In one embodiment, after NFC device 100 is powered on, NFC device 100 sends a system power control signal 154 to power switch 156. System power control signal 154 keeps power switch 156 switched on, even after the external field detect signal 152 is turned off because RF power 125 is no longer detected by the energy harvesting unit of NFC frontend 150. The RF power 125 may be turned off either because the counterpart NFC device 120 is no longer transmitting the RF power signal, or because the counterpart NFC device 120 has moved away from the detection range of antenna 130. Because power switch 156 is kept switched on, NFC device 100 needs to switch itself back to the unpowered state again. In one embodiment, this power down can be done after a period of inactivity. In another embodiment, this power down can be done after an event trigger. In yet another embodiment, this power down can be done by a second device (not shown in FIG. 1) that is different from NFC device 100.

In another embodiment (which is not shown in FIG. 1), NFC device 100 does not have a system power control 154, so power switch 156 is now only controlled by external field detect 152. Here, power switch 156 can be switched off either (1) after the energy harvesting unit of NFC frontend 150 no longer detects a RF power 125, or (2) after a period of no RF power detection, or (3) after an event trigger, or (4) by a second device (not shown in FIG. 1) that is different from NFC device 100.

A feature of this invention disclosure is to use the energy-harvesting functionality of an NFC device as an event to trigger system configuration changes without additional battery power supply. FIG. 1 shows that an example of this is to connect the battery to power up the system after detecting an external RF field. It is not shown in FIG. 1, but a further application is to control an NFC protection circuitry very quickly after the NFC device is exposed to an external HF field.

An embodiment of the invention (see FIG. 2) comprises a battery powered device 200 detecting a RF power 225 transmitted by a NFC counterpart device 220. The battery powered device 200 comprises a system battery 250, power switch 251, power switch 252, host controller 260, system supply management 270, NFC device 230, antenna interface 285, antenna 280, and other system components 290. The NFC device 230 comprises a supply unit 232, NFC device control 234, antenna TX/RX (transmitter/receiver) interface 236, and energy-harvesting unit 240. The system battery 250 is in electrical connection with the system supply management 270 via power switch 251 and power switch 252. The host controller 260 is in electrical connection with the system supply management 270 and NFC device control 234. The system supply management 270 is in electrical connection with power switch 251 and power switch 252, the host controller 260, the supply unit 232, and the other system components 290. The supply unit 232, NFC device control 234, and antenna TX/RX interface 236 are each in electrical connection with the other, and the antenna TX/RX interface 236 is further in electrical connection with the antenna interface 285. The energy-harvesting unit 240 comprises a limiter 242 operatively linked to a rectifier 244, while the rectifier is operatively linked to the antenna interface 285 to receive signal from antenna 280 via the antenna interface 285.

Figure 2:
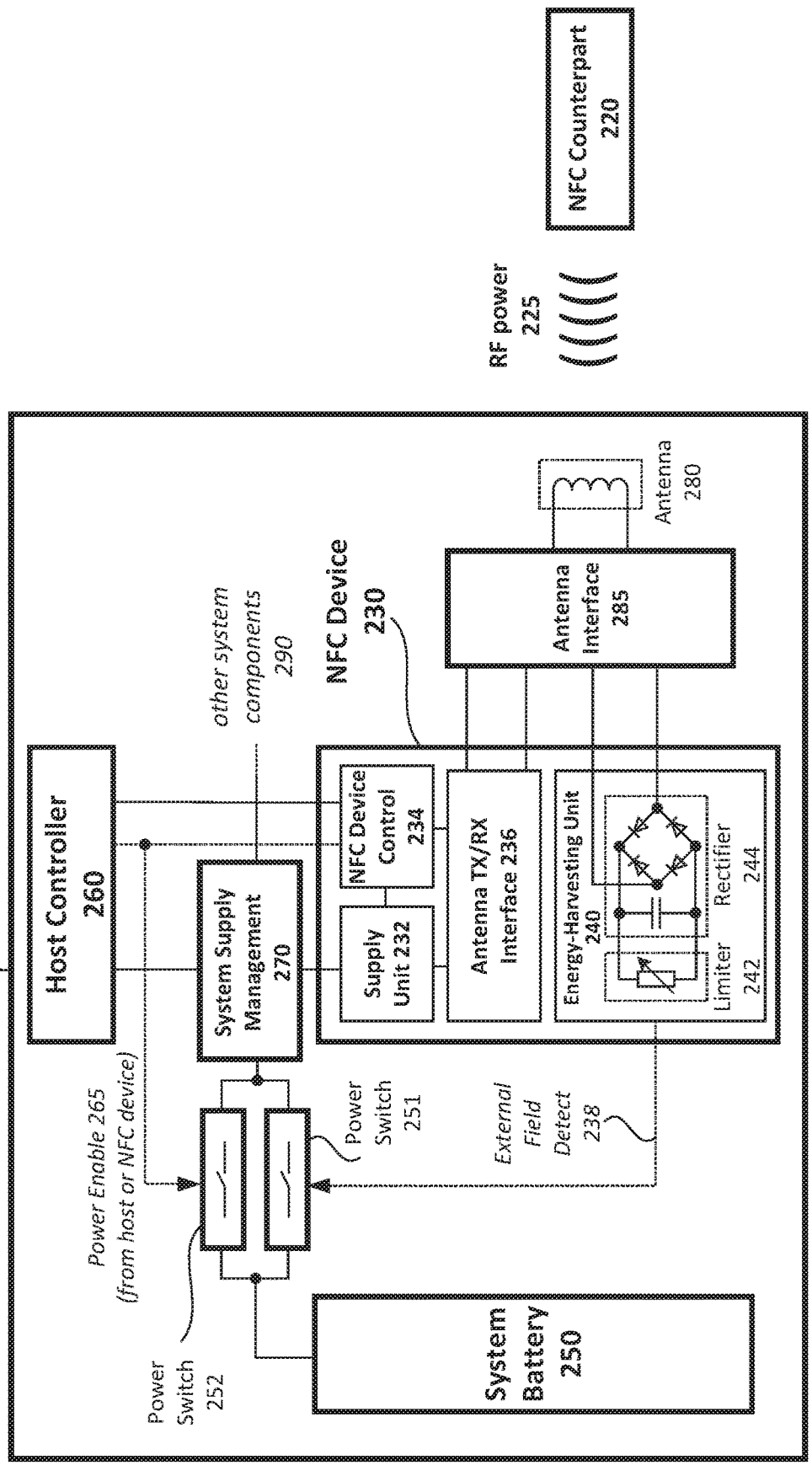
FIG. 2 shows a block diagram of a battery powered device with energy harvesting wakeup where an energy harvesting unit is a part of a NFC device.

Initially, battery powered device 200 is not active, and power switch 251 and power switch 252 are not switched on, so the rest of device 200 is disconnected from system battery 250. Device 200 is in an unpowered state, which saves power, prolonging the life of system battery 250. NFC counterpart device 220 (such as a mobile phone) can generate radio frequency (RF) power 225, typically in the 13.56 MHz band. When NFC counterpart device 220 is brought near to antenna 280, energy-harvesting unit 240 detects RF power 225 via antenna 280 and antenna interface 285. The incoming signal is an AC (alternating current) signal, so rectifier 244 converts this AC signal into a DC (direct current). In FIG. 2, rectifier 244 is shown to be comprised of a bridge rectifier circuit and a blocking capacitor, which together perform this AC to DC signal conversion. This DC signal is then sent to a limiter 242, which limits the maximum voltage or power to pass through. The final output from the energy-harvesting unit 240 is then sent as external field detect signal 238 to power switch 251. At this point, battery powered device 200 is unpowered by system battery 250, but the energy-harvesting unit 240 is capable of detecting RF power 225 and transmitting the external field detect signal 238 to power switch 251 without requiring any battery power. External field detect signal 238 triggers power switch 251 to be switched on, connecting system battery 250 to the system supply management 270 and the rest of battery powered device 200. With battery power supplied, device 200 is powered on and activated. After activation, device 200 can perform actions required to communicate to the NFC counterpart device 220 (e.g., a mobile phone). Later, in some embodiments, device 200 can switch itself back into the unpowered state again. In some other embodiments, a second device (not shown in FIG. 2) can switch device 200 into the unpowered state again.

As described earlier, in some embodiments, device 200 can switch itself back into the unpowered state again. Regarding this scenario, in some embodiments, switching device 200 itself into the unpowered state can be performed by the host controller 260. In some other embodiments, switching device 200 itself into the unpowered state can be performed by the NFC device 230. In yet some other embodiments, switching device 200 itself into the unpowered state can be performed by the other system components 290. In still some other embodiments, switching device 200 itself into the unpowered state can be performed by some other parts of device 200.

In one embodiment, after device 200 is powered on, device 200 sends a power enable signal 265 (from host or NFC device) to power switch 252. Power enable signal 265 keeps power switch 252 switched on, even after the external field detect signal 238 has turned off and switched off power switch 251. This, in turn, maintains the power supply from the system battery 250 to device 200, because power switch 251 and power switch 252 are arranged in parallel. In other words, device 200 can remain in a powered state, even after the NFC counterpart device 220 has moved away from the detection range of antenna 280 or the counterpart NFC device 220 is no longer transmitting the RF power signal. Because power switch 252 is kept turned on, device 200 needs to switch itself back into the unpowered state again. In one embodiment, this power down can be done after a period of inactivity. In another embodiment, this power down can be done after an event trigger. In yet another embodiment, this power down can be done by a second device (not shown in FIG. 2) that is different from device 200.

In another embodiment (which is not shown in FIG. 2), device 200 does not have a power enable 265 and a power switch 252, so only power switch 251 controls the electrical connection to the system battery 250. Then power switch 251 can be switched off either (1) after the energy-harvesting unit 240 no longer detects a RF power 225, or (2) after a period of no RF power detection, or (3) after an event trigger, or (4) by a second device (not shown in FIG. 2) that is different from device 200.

FIG. 2 again shows that the energy-harvesting functionality of an NFC device can be used as an event to trigger system configuration changes without additional battery power supply. In FIG. 2, this is to connect the battery to power up the system after detecting an external RF field. It is not shown in FIG. 2, but a further application is to control an NFC protection circuitry very quickly after the NFC device is exposed to an external HF field.

Figure 3:
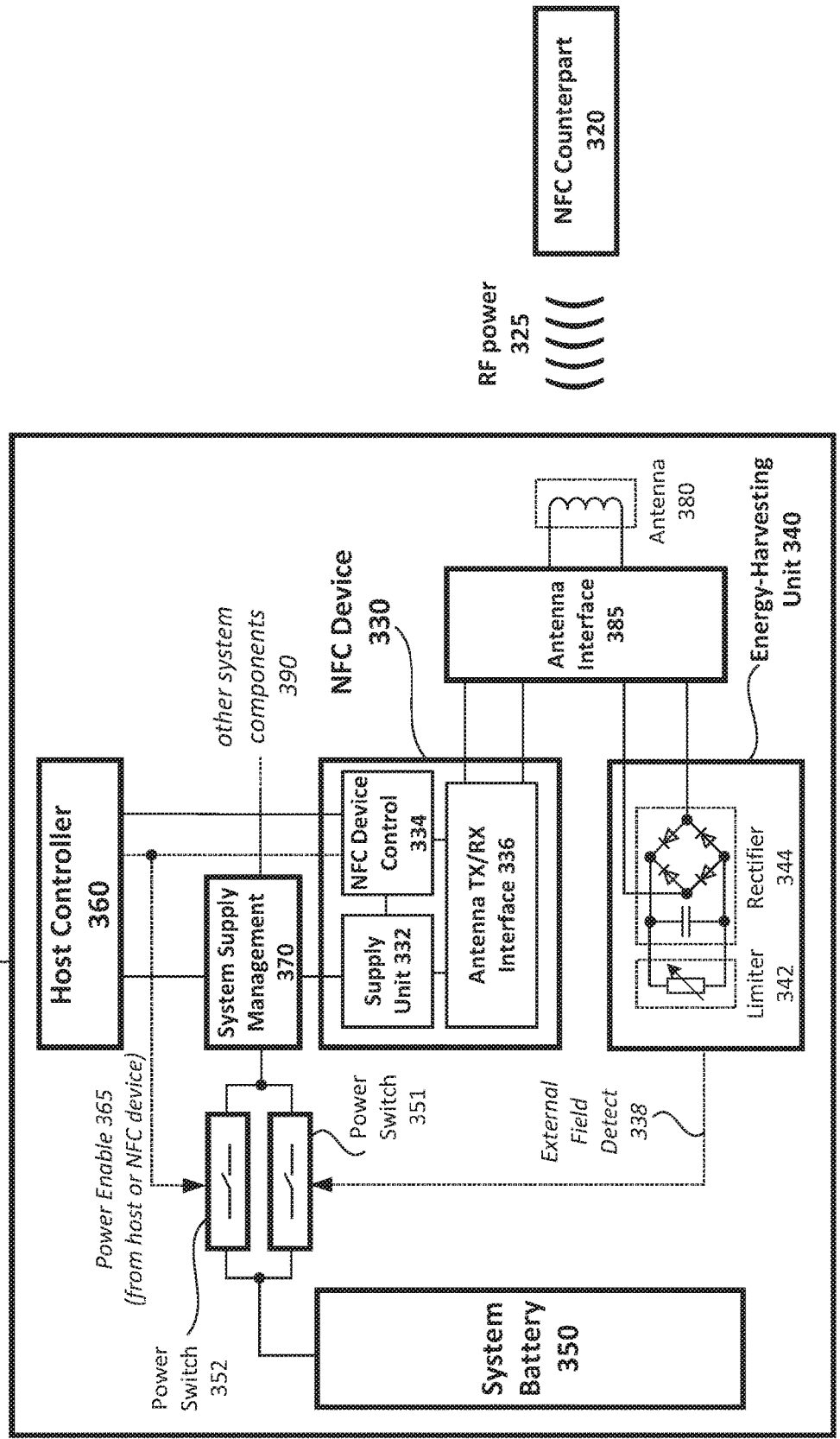
FIG. 3 shows a block diagram of a battery powered device with energy harvesting wakeup where an energy harvesting unit is distinct from a NFC device.

Another embodiment of the invention is shown in FIG. 3. The embodiment shown in FIG. 3 is very similar to FIG. 2, except for the energy harvesting unit. In FIG. 2, the energy harvesting unit 240 is a part of a NFC device (230). In FIG. 3, the energy harvesting unit 340 is distinct from a NFC device (330). In some embodiments, there can be technical and/or cost advantages to either being a part of a NFC device, or being distinct from a NFC device.

In particular, the embodiment shown in FIG. 3 comprises a battery powered device 300 detecting a RF power 325 transmitted by a NFC counterpart device 320. The battery powered device 300 comprises a system battery 350, power switch 351, power switch 352, host controller 360, system supply management 370, NFC device 330, energy harvesting unit 340, antenna interface 385, antenna 380, and other system components 390. The NFC device 330 comprises a supply unit 332, NFC device control 334, and antenna TX/RX (transmitter/receiver) interface 336. Energy-harvesting unit 340 is distinct from NFC device 330. The system battery 350 is in electrical connection with the system supply management 370 via power switch 351 and power switch 352. The host controller 360 is in electrical connection with the system supply management 370 and NFC device control 334. The system supply management 370 is in electrical connection with power switch 351 and power switch 352, the host controller 360, the supply unit 332, and the other system components 390. The supply unit 332, NFC device control 334, and antenna TX/RX interface 336 are each in electrical connection with the other, and the antenna TX/RX interface 336 is further in electrical connection with the antenna interface 385. The energy-harvesting unit 340 comprises a limiter 342 operatively linked to a rectifier 344, while the rectifier is operatively linked to the antenna interface 385 to receive signal from antenna 380.

In all respects, the embodiment in FIG. 3 operates similarly as the embodiment in FIG. 2. For example, energy-harvesting unit 340 can be used to detect RF power 325, which is generated by NFC counterpart 320. In turn, detection of RF power 325 enables energy-harvesting unit 340 to transmit external field detect signal 338 to power switch 351 without requiring use of any battery power. External field detect signal 338 switches on power switch 351, so that battery powered device 300 can be powered up and activated. Later, in some embodiments, device 300 can switch itself into the unpowered state again. In some other embodiments, a second device (not shown in FIG. 3) can switch NFC device 300 into the unpowered state again. Additionally, device 300 also provides for a power enable 365 (from host or NFC device), which can keep power switch 352 switched on, even after the external field detect signal 338 has been turned off and the power switch 351 has been switched off.

As described earlier, in some embodiments, device 300 can switch itself back into the unpowered state again. Regarding this scenario, in some embodiments, switching device 300 itself into the unpowered state can be performed by the host controller 360. In some other embodiments, switching device 300 itself into the unpowered state can be performed by the NFC device 330. In yet some other embodiments, switching device 300 itself into the unpowered state can be performed by the energy-harvesting unit 340. In still some other embodiments, switching device 300 itself into the unpowered state can be performed by the other system components 390. In some other embodiments, switching device 300 itself into the unpowered state can be performed by some other parts of device 300.

Figure 4:
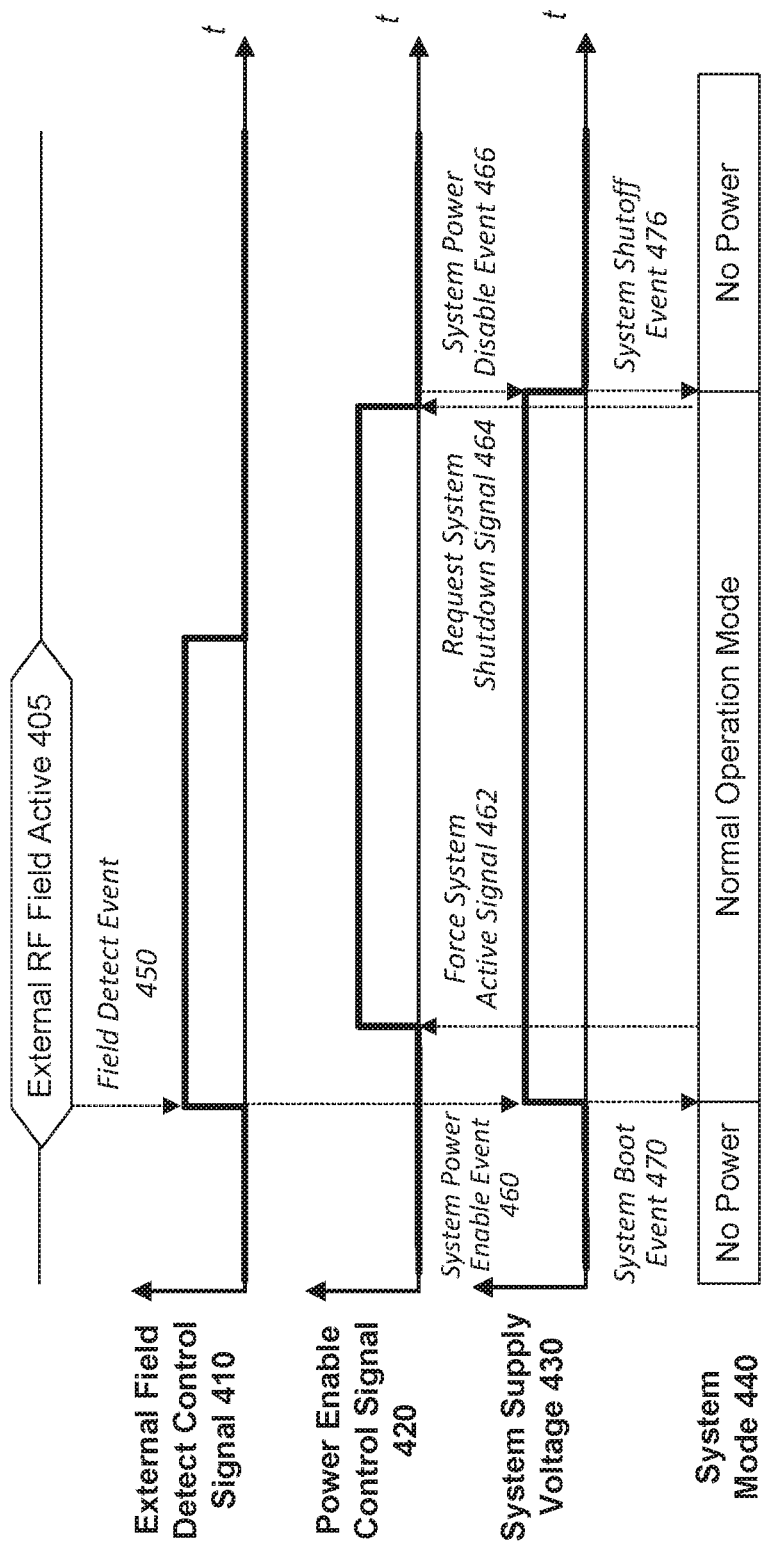
FIG. 4 shows a sequential description of an energy harvesting NFC system wakeup.

FIG. 4 shows a sequential description of an energy-harvesting NFC System wakeup. The x-axis indicates time (t). The y-axis indicates value or amount. For comparisons to FIGS. 1-3, external RF field active 405 corresponds to the RF power 125 shown in FIG. 1, the RF power 225 shown in FIG. 2, and the RF power 325 shown in FIG. 3. External field detect control signal 410 corresponds to the external field detect 152 shown in FIG. 1, the external field detect 238 shown in FIG. 2, and the external field detect 338 shown in FIG. 3. Power enable control signal 420 corresponds to the system power control 154 shown in FIG. 1, the power enable 265 shown in FIG. 2, and the power enable 365 shown in FIG. 3. System supply voltage 430 corresponds to the power received by NFC device 100 from battery 140 shown in FIG. 1, the power received by device 200 from system battery 250 shown in FIG. 2, and the power received by device 300 from system battery 350 shown in FIG. 3. System mode 440 corresponds to the power mode of NFC device 100 shown in FIG. 1, the power mode of device 200 shown in FIG. 2, and the power mode of device 300 shown in FIG. 3.

The following description of FIG. 4 will be made with reference to FIG. 1. But there is the understanding that similar descriptions of FIG. 4 can also be made with reference to FIGS. 2 and 3.

Initially, the system mode 440 is "no power". This correspond to a powered down state of NFC device 100, when NFC device 100 is electrically disconnected from battery 140 and there is no RF power 125 detected. Then, at field detect event 450, a counterpart NFC device 120 (such as a mobile phone) is brought near to antenna 130. Counterpart NFC device 120 generates radio frequency (RF) power 125, which is detected by the energy harvesting unit of NFC frontend 150 via an antenna 130. It can be seen that the external RF field active 405 (corresponding to RF power 125) has been increasing before field detect event 450. Therefore, the field detect event 450 occurs at a time when a sufficient signal from external RF field active 405 (corresponding to RF power 125) is present to switch on the external field detect control signal 410. External field detect control signal 410 (corresponding to external field detect 152) triggers power switch 156 to be switched on, connecting battery 140 to the rest of NFC device 100 and powering up NFC device 100. This corresponds to the system power enable event 460, when the NFC device becomes fully powered and switched on. This, in turn, leads to the system boot event 470, when the system mode transitions to the normal operation mode. Then, after a short time period, NFC device 100 sends a system power control signal 154 to power switch 156. This corresponds to the force system active signal event 462, since system power control signal 154 (FIG. 1) corresponds to power enable control signal 420 (FIG. 4).

Later, the external RF field active 405 (corresponding to RF power 125) is no longer detected, since the counterpart NFC device 120 has either moved away from the detection range of antenna 130, or the counterpart NFC device 120 is no longer transmitting the RF power signal. The absence of the external RF field active 405 causes the external field detect control signal to drop to zero (i.e., turn "off"). But the power enable control signal 420 is still "on", so the system supply voltage 430 remains "on" and the system mode 440 remains in "normal operation mode". This is because power switch 156 remains switched "on".

Still later, after a certain time period, in some embodiments, the power enable control signal 420 is turned "off" by the NFC device 100. In some other embodiments, the power enable control signal 420 is turned "off" by a second device (not shown in FIG. 1) that is different from NFC device 100. In FIG. 4, this is shown as request system shutdown signal 464. This event triggers the system power disable event 466, when the system supply voltage 430 drops to zero (i.e., turn "off") and the NFC device 100 enters into the "no power" system mode. In FIG. 1, the system power disable event 466 would correspond to when the power switch 156 is switched "off", cutting off power to the rest of NFC device 100 from battery 140.

Figure 5:
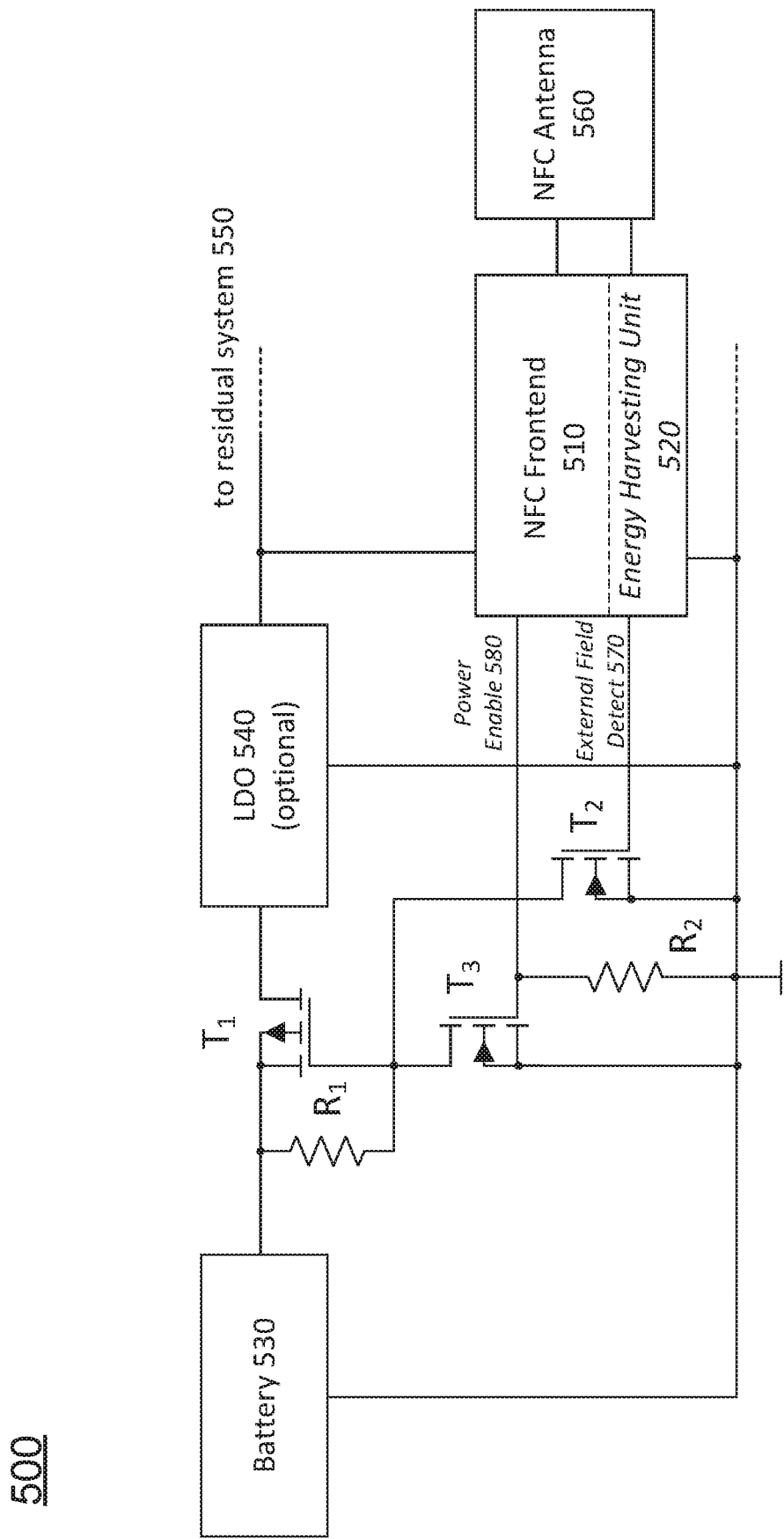
FIG. 5 shows a circuit diagram of an embodiment of an NFC communications device that can implement the functionality shown in FIG. 4 (i.e., a power switch remains enabled even after an external RF field is no longer detected).

FIG. 5 shows a circuit diagram of an embodiment of a NFC communications device that can implement the functionality shown in FIG. 4 (i.e., a power switch remains enabled even after an external RF field is no longer detected). The NFC communications device 500 consists of a battery 530 that can supply power, an NFC frontend 510, an optional LDO (Low Drop Out regulator) 540, power control and residual system 550. The NFC frontend 510 is connected to a NFC antenna 560. In the default unpowered state, PMOS T1 is non-conductive as its gate voltage is not pulled to GND (NMOS T2 and NMOS T3 are conductive). Note that T1's default state is non-conductive as it is the gate voltage forced to the drain voltage. (Note: PMOS denotes p-channel MOSFET (metal-oxide-semiconductor field-effect transistor). NMOS denotes n-channel MOSFET. GND denotes ground.)

The NFC communications device 500 comprises an energy harvesting unit 520, which comprises an internal rectifier and limiter structure that is connected the NFC antenna 560. If the NFC device 500 is placed into the proximity of another 13.56 MHz generating device, the rectified and controlled voltage "External Field Detect" 570 is present even in unpowered device system state. The presence of "External Field Detect" 570 causes NMOS T2 to become conductive and to pull T1's gate voltage to GND. This causes the battery voltage to be supplied to the optional LDO and the system's sub circuits. The complete system boots as triggered by the presence of the external field. NFC data communication can be performed now.

When the NFC Frontend 510 is started, it raises control signal "Power Enable" 580 to switch NMOS T3 into the conductive state and force T1's gate voltage to GND. Even if the external field vanishes, the system stays in the supplied state. The control signal "Power Enable" 580 can optionally be controlled by another system component.

A system shutdown can be triggered by de-asserting the "Power Enable" 580 signal. In some embodiments, this is triggered by the NFC Frontend 510's host controller. In some other embodiments, this can be triggered by another system component, or by another system. If no external field is present, T1 will become non-conductive and the system is unpowered.

The system's power consumption in off state is defined by the MOS transistors drain source resistance in off state and the selected resistors. Components can be chosen to result in a negligible low residual current by being far below the conventional supply standby currents.

Figure 6:
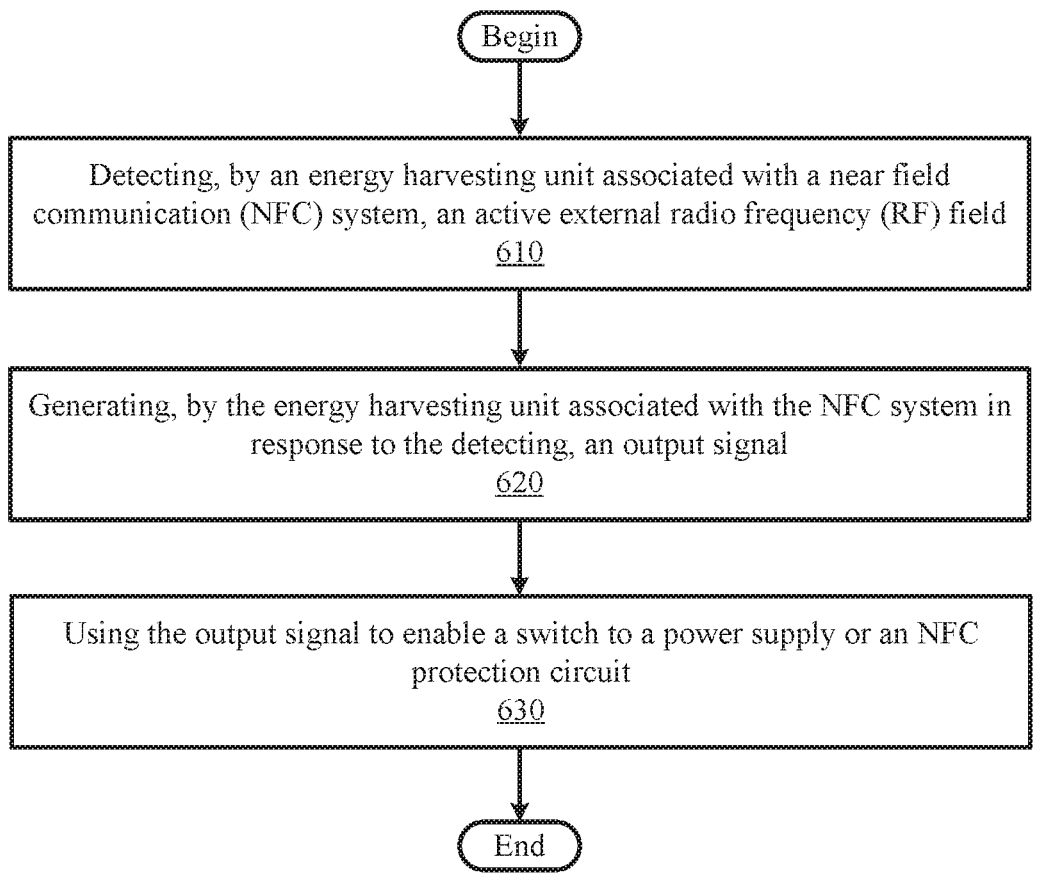
FIG. 6 shows an embodiment of a method of the invention.

FIG. 6 shows an embodiment of a method of the invention. As shown in FIG. 6, the method 600 begins at step 610, where the method detects, by an energy harvesting unit associated with a near field communication (NFC) system, an active external radio frequency (RF) field. Then, the method proceeds to step 620. In step 620, the method generates, by the energy harvesting unit associated with the NFC system in response to the detecting, an output signal. Next, at step 630, the method uses the output signal to enable a switch to a power supply or an NFC protection circuit.

Figure 7:
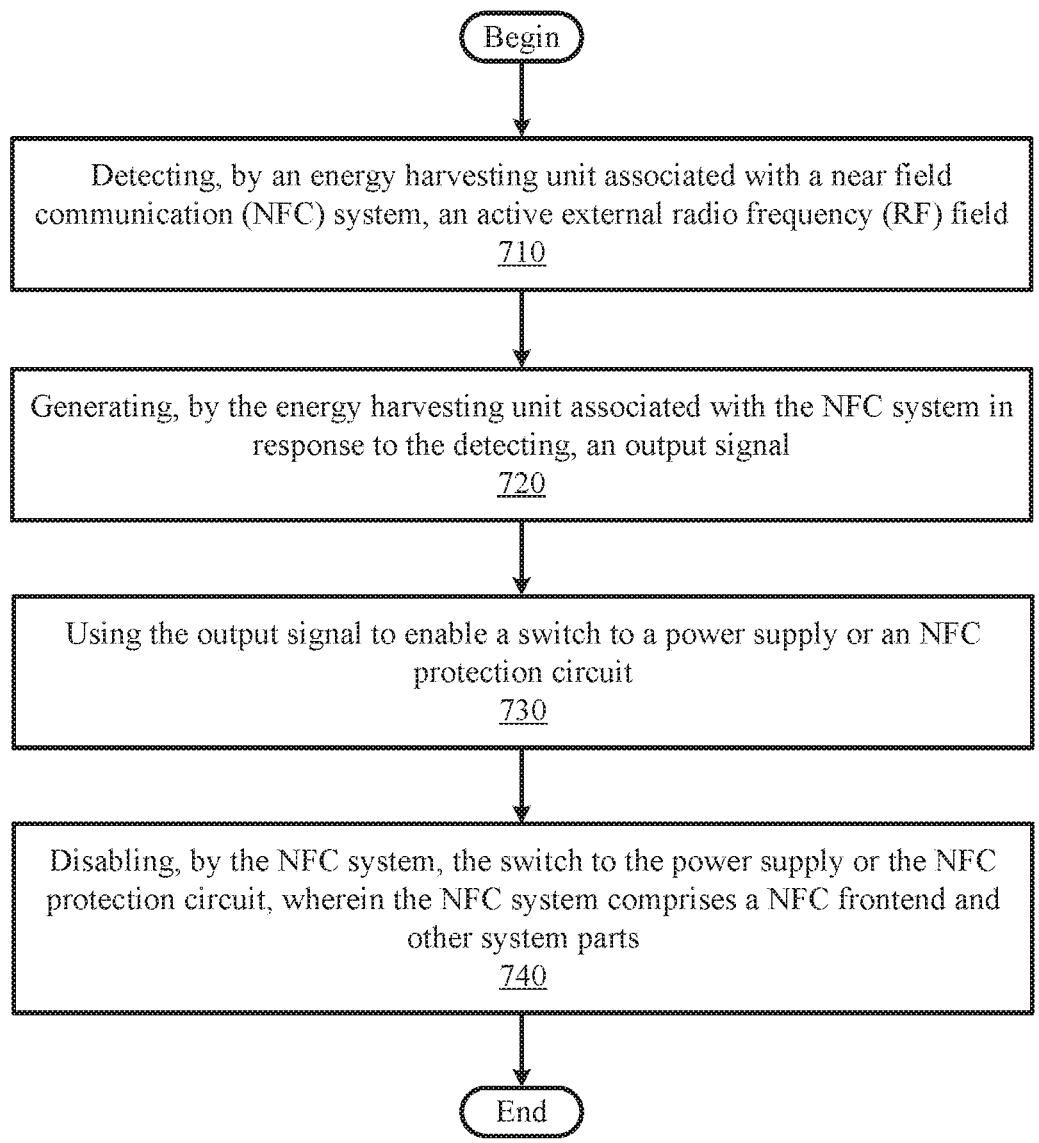
FIG. 7 shows another embodiment of a method of the invention, which includes the method step of the NFC system disabling the switch to the power supply or the NFC protection circuit.

FIG. 7 shows another embodiment of a method of the invention, which includes the method step of the NFC system disabling the switch to the power supply or the NFC protection circuit. As shown in FIG. 7, the method 700 begins at step 710, where the method detects, by an energy harvesting unit associated with a near field communication (NFC) system, an active external radio frequency (RF) field. Then, the method proceeds to step 720. In step 720, the method generates, by the energy harvesting unit associated with the NFC system in response to the detecting, an output signal. Next, at step 730, the method uses the output signal to enable a switch to a power supply or an NFC protection circuit. Then, at step 740, the method disables, by the NFC system, the switch to the power supply or the NFC protection circuit, wherein the NFC system comprises a NFC frontend and other system parts.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   detecting, by an energy harvesting unit associated with a near field communication (NFC) system, an active external radio frequency (RF) field;
   generating, by the energy harvesting unit associated with the NFC system in response to the detecting, an output signal; and
   using the output signal to enable a first switch connected to a battery,
   wherein the first switch allows for the battery to provide power to the NFC system,
      wherein the first switch is disabled when the energy harvesting unit no longer detects the active external radio frequency (RF) field so that power of the battery is conserved;
      generating, by a control module of the NFC system, a power enable signal;
      using the power enable signal to enable a second switch to the battery,
      wherein the control module is activated when the first switch to the battery is enabled, and the second switch to the battery remains enabled even when the energy harvesting unit no longer detects the active external radio frequency (RF) field; and
      disabling, by a second system, the second switch to the battery,
   wherein the NFC system comprises a NFC frontend and other parts,
   wherein the second system is different from the NFC system,
   wherein the second system comprises another NFC frontend and other parts, and
   wherein the second system transmits a shutdown request signal to the NFC system.

2. The method of claim 1, wherein the energy harvesting unit is capable of supplying power to the NFC system without using power from the battery.

3. The method of claim 1 further comprising:
   using the output signal to enable a second switch to an NFC protection circuit, wherein the second switch allows for the NFC protection circuit to protect the NFC system.

4. The method of claim 1, wherein the energy harvesting unit comprises:
   a bridge rectifier circuit, and
   a blocking capacitor.

5. The method of claim 1, wherein the energy harvesting unit derives a direct current (DC) voltage out of an alternating current (AC) high frequency (HF) field.

6. The method of claim 1, wherein the battery is a system power supply.

7. The method of claim 1, wherein the active external radio frequency (RF) field is generated by an NFC counterpart device.

8. The method of claim 7, wherein the NFC counterpart device is a mobile phone.

* * * * *